United States Patent
Soin et al.

(10) Patent No.: US 12,476,911 B2
(45) Date of Patent: Nov. 18, 2025

(54) MECHANISM TO MANAGE BIDIRECTIONAL TRAFFIC FOR HIGH AVAILABILITY NETWORK DEVICES

(71) Applicant: Arista Networks, Inc., Santa Clara, CA (US)

(72) Inventors: Tarun K. Soin, Santa Clara, CA (US); Venkitraman Kasiviswanathan, San Ramon, CA (US); Xiangyi Guo, Santa Clara, CA (US); Aparna Karanjkar, Santa Clara, CA (US)

(73) Assignee: Arista Networks, Inc., Santa Clata, CA (US)

( * ) Notice: Subject to any disclaimer, the term of this patent is extended or adjusted under 35 U.S.C. 154(b) by 288 days.

(21) Appl. No.: 17/986,971

(22) Filed: Nov. 15, 2022

(65) Prior Publication Data
US 2023/0291685 A1    Sep. 14, 2023

Related U.S. Application Data

(60) Provisional application No. 63/317,809, filed on Mar. 8, 2022.

(51) Int. Cl.
*H04L 45/74* (2022.01)

(52) U.S. Cl.
CPC .................................. *H04L 45/74* (2013.01)

(58) Field of Classification Search
CPC ..... H04L 47/125; H04L 45/74; H04L 45/745; H04L 45/7453; H04L 63/0245; H04L 63/1408
See application file for complete search history.

(56) References Cited

U.S. PATENT DOCUMENTS

| | | | |
|---|---|---|---|
| 2010/0325257 A1 | 12/2010 | Goel et al. | |
| 2013/0155902 A1* | 6/2013 | Feng | G06F 11/16 370/255 |
| 2014/0153577 A1* | 6/2014 | Janakiraman | H04L 49/3009 370/392 |
| 2015/0365323 A1 | 12/2015 | Duminuco et al. | |

FOREIGN PATENT DOCUMENTS

WO    2014120838 A2    8/2014

* cited by examiner

*Primary Examiner* — Mansour Oveissi
(74) *Attorney, Agent, or Firm* — Tianyi He

(57) ABSTRACT

A method for obtaining, by a first network device of a pair of network devices, a packet, wherein the packet specifies a source address corresponding to a first client device and a destination address corresponding to a second client device, making a first determination, by the first network device and using the source address and the destination address, that the first network device is not an owner of bidirectional traffic associated with the packet, based on the first determination, transmitting, by the first network device, the packet to a second network device of the pair of network devices, making a second determination, by the second network device, that the second network device is the owner of bidirectional traffic associated with the packet, performing, in response to the second determination and by the second network device, data processing on the packet to generate a processing result.

20 Claims, 7 Drawing Sheets

MECHANISM TO MANAGE BIDIRECTIONAL TRAFFIC FOR HIGH AVAILABILITY NETWORK DEVICES

CROSS-REFERENCE TO RELATED APPLICATIONS

This application claims priority to U.S. Provisional Application No. 63/317,809 filed Mar. 8, 2022, the entirety of which is incorporated herein by reference.

BACKGROUND

A communication system may enable devices to communicate with one another. The communication system may include devices that relay information from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1A:
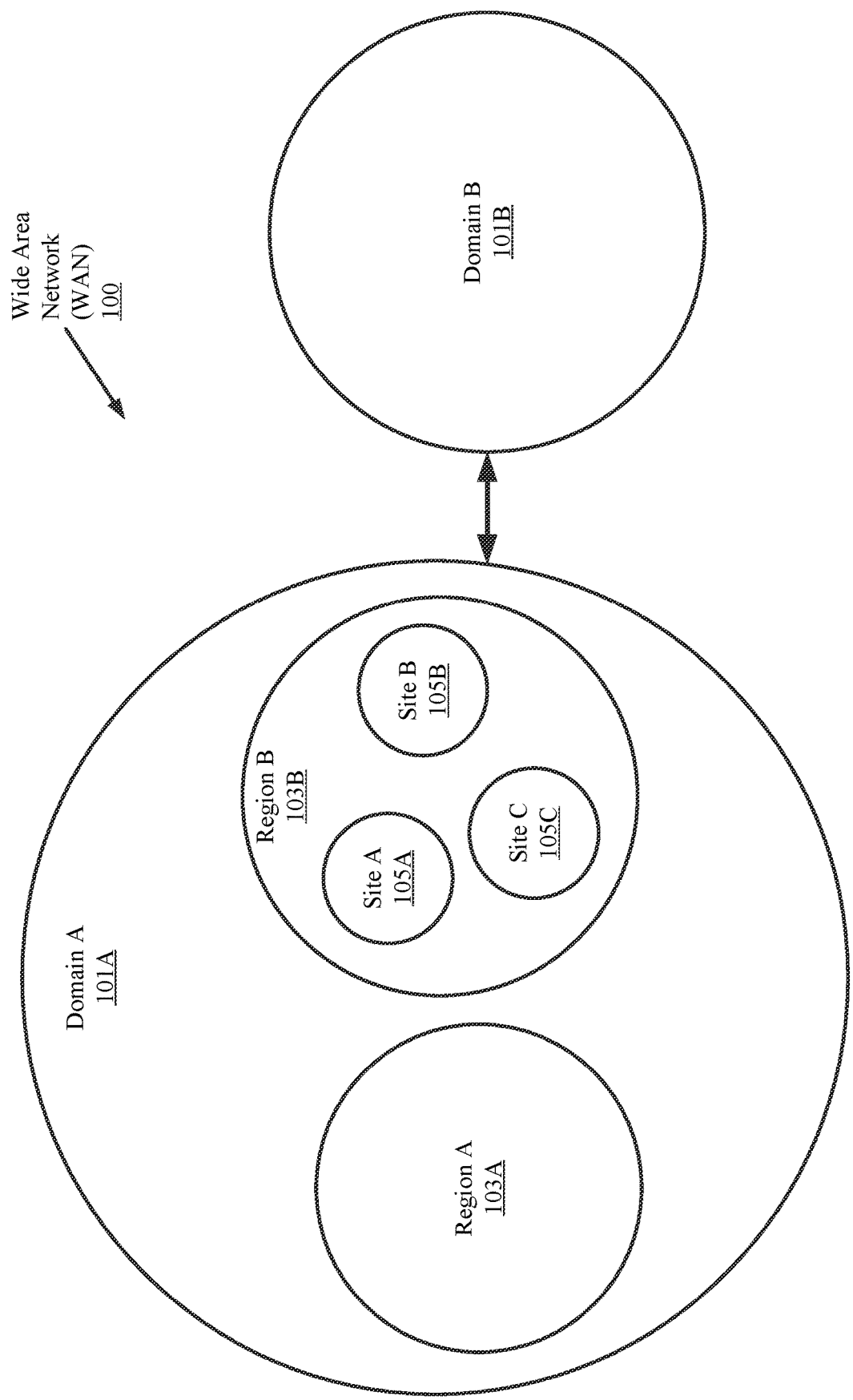
FIG. 1A shows an example of a wide area network (WAN) in accordance with one or more embodiments.

In traditional network environments, there may be a desire for network devices to have the ability to monitor the flow of packets. The packets may travel locally (e.g., in a local area network (LAN)) or in a wider span of a network (e.g., in a wide area network (WAN)).

The processing of packets may include performing a deep packet inspection (DPI) for the purpose of classifying the flow. The classification may be performed, for example, for the purpose of implementing a dynamic path selection (DPS) mechanism. The network device(s) performing the processing may obtain path information corresponding to the packet flow and analyze the path information to determine future options for path selection.

In order to optimize the processing (e.g., classification, routing, quality of service, security treatment, etc.) of packets associated with a given flow, it is beneficial to monitor the flow bi-directionally. For example, the packet flow may be monitored based on a pair of packets corresponding to a flow, where one packet is sent by a first client device as the source to a second client device as the destination, and a reverse packet is obtained by the first client device from the second client device.

In addition, in a production environment, it is also beneficial to implement high availability network devices, typically in pairs. The use of pairs of high availability network devices enables the production environment to be fault tolerant and to also distribute the processing load across the pair of high availability network devices. However, the traditional configuration of high availability network device pairs permits either of the high availability network devices to receive packets associated with a given flow. In the traditional configuration, each of the high availability network devices in the pair may receive packets associated with a given flow and process the packets. As a result, both high availability network devices in the pair perform processing on the flow resulting in a duplication of effort as each high availability network device in the pair performs its own processing on the packets associated with the flow. Further, for a given flow, if an onward packet (e.g., a request packet) of the flow is obtained and/or processed by a first high availability network device of the pair and a second packet (e.g., a response to the onward packet) of the flow is obtained and/or processed by a second high availability network device of the pair, the processing may be performed using insufficient data or be impossible to perform. It would be beneficial for a given flow for both packets to be processed by the same high availability network device.

To address at least the processing inefficiency discussed above, one or more embodiments of the disclosure, enable a single high availability network device of a pair of high availability network devices to process all packets associated with a given flow. More specifically, embodiments disclosed herein include methods and systems for assigning (statically or dynamically) each flow to one of the pair of high availability network devices. Once assigned, all packets of a given flow are analyzed (e.g., via DPI) by the assigned high availability network device regardless of which of the high availability network device initially receives the packet.

To ensure that a high availability network device that is tasked with processing (or otherwise assigned to process) the bidirectional traffic (also referred to as "owning the flow"), embodiments disclosed herein include a method and system for maintaining pre-assigned flow ownership by each of the high availability network devices. In alternative embodiments, a method and system includes performing dynamic assignment of ownership of a flow. The dynamic assignment may be performed, for example, based on a load balancing of the high availability network devices.

In one or more embodiments, the method and system includes performing assignment of ownership of a flow based on a virtual router redundancy protocol (VRRP). The VRRP may include implementing a virtual router that includes a logical grouping of multiple high availability network devices, where one is assigned as the master network device and therefore the owner of any flows obtained while the network device is assigned the non-master network device.

Various embodiments of the disclosure are described below.

FIG. 1A shows an example of a wide area network (WAN) (100) in accordance with one or more embodiments disclosed herein. The WAN (100) may be a telecommunications network that extends over a large geographic area for implementing computer networking features. As shown in FIG. 1A, the WAN (100) may be divided into a hierarchy including, but not limited to, domains (101A, 101B), regions (103A, 103B), and sites (105A-105C). As one example, each domain (101A, 101B) may cover a continent (e.g., North America, Europe, etc.), each region (103A, 103B) may cover some or more states, cities, and/or provinces within the domain (101A, 101B), and each site may represent a physical location (and or virtual instance thereof) (e.g., a building such as an office, school, hospital, etc.) within a region (103A, 103B).

Although the WAN (100) of FIG. 1A is shown as having only two domains (101A, 101B), two regions (103A, 103B), and three sites (105A, 105C), one of ordinary skill in the art would appreciate that the WAN (100) may have any number of each of these components without departing from the scope of one or more embodiments herein. Additionally, different terms and/or examples may be used to describe each hierarchical level of the WAN (100) without departing from the scope of one or more embodiments. For example, a domain may cover a portion (e.g., half) of a continent rather than a full area of the continent.

In one or more embodiments, each domain (101A, 101B), region (103A, 103B), and site (105A-105C) of the WAN (100) may include network devices (discussed in more detail below in FIG. 1B) that are able to communicate (e.g., transfer information in the form of network traffic such as data packets) with one another using one or more service providers (e.g., 119A, 119N). As an example, each site (105A-105C) may include one or more branch network devices (e.g., 111A, 111N, FIG. 1B). Each region (103A, 103B) may include at least one hub network device (e.g., 113A-113N, FIG. 1B) as a relay point for the branch network devices of that region to communicate with network devices in other regions (including regions of other domains). The hub network device may also be located at one of the sites (105A-105C) along with one or more of the branch network devices. Additionally, each domain (101A, 101B) may have a network controller (e.g., 115, FIG. 1B) in charge of controlling and/or monitoring the network devices within that domain.

A more detailed example of the WAN (100) structure with network devices included within each level of the WAN (100) hierarchy is provided below in reference to FIGS. 3A-3C.

Figure 1B:
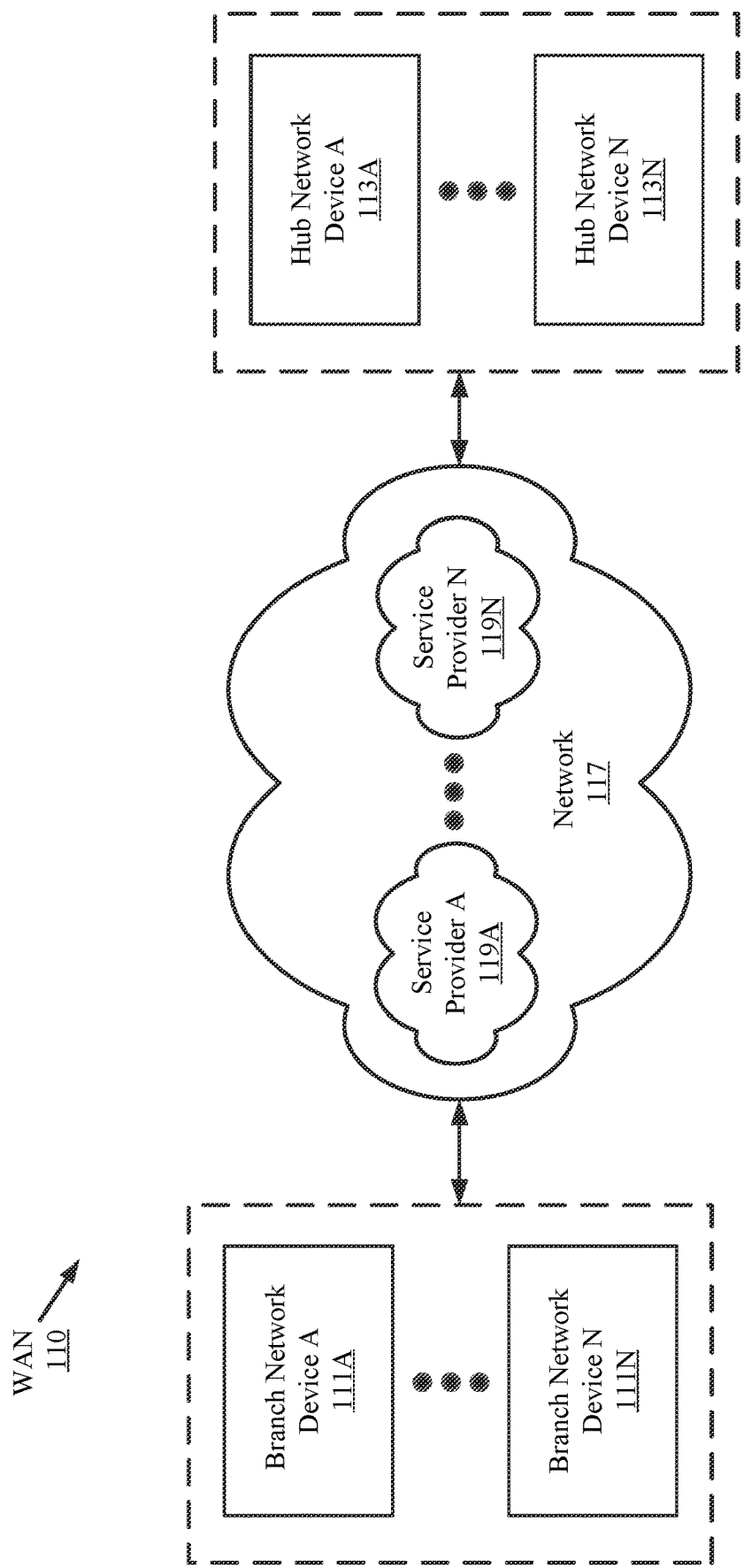
FIG. 1B shows a system in accordance with one or more embodiments described herein.

FIG. 1B shows a WAN (110) in accordance with one or more embodiments of the disclosure. As discussed above, the WAN (110) may include components that are physically located within each hierarchical level of the WAN (100). In particular, the WAN (110) includes one or more branch network devices (111A, 111N) and one or more hub network devices (113A, 113N) that are connected through a network (117) composed of one or more service providers (119A, 119N). Each of these components is described below.

In one or more embodiments disclosed herein, the one or more branch network device(s) (111A, 111N) are physical devices that include persistent storage, memory (e.g., random access memory), one or more processor(s) (including a switch chip), and two or more physical ports. Examples of the branch network devices (111A, 111N) include, but are not limited to, a router, a switch, a top of rack (TOR) switch, and a multilayer switch that are connected to one or more client devices (not shown) (e.g., computers, laptops, smartphones, tablets, etc.). As discussed above, in the context of the WAN (100) in FIG. 1A, each site (105A-105C) of the WAN (100) may include one or more of the branch network devices (111A, 111N). The branch network devices (111A, 111N) are not limited to the aforementioned specific examples.

The switch chip is hardware that determines which egress port on a branch network device (111A, 111N) to forward packets (which may be in the form of media access control (MAC) frames). The switch chip may include egress and ingress ports that may connect to ports on the branch network device (111A, 111N). Each port may or may not be connected to another device (e.g., a server, a switch, a router, etc.). The branch network device (111A, 111N) may be configured to receive the packets via the ports.

Additionally, the persistent storage in the branch network devices (111A, 111N) may include any type of non-transitory computer readable medium that stores data. For example, the data in the persistent storage may be instructions, which, when executed by one or more processor(s) in the branch network device (111A, 111N), enable the branch network device (111A, 111N) to perform one or more functions of the branch network device (111A, 111N).

In one or more embodiments disclosed herein, similar to the branch network devices (111A, 111N), the one or more hub network devices (113A, 113N) are physical devices that include persistent storage, memory (e.g., random access memory), one or more processor(s), and two or more physical ports. Examples of the hub network devices (113A, 113N) include, but are not limited to, a hub router that connects and manages one or more branch network devices (111A, 111N). For example, a hub network device (113A, 113N) may be configured as a network hub that broadcasts data to every branch network device (111A, 111N) that is connected to the hub network device (113A, 113N). As discussed above, in the context of the WAN (100) in FIG. 1A, each region (103A, 103B) may include at least one hub network device (113A, 113N) that is connected to each of the branch network devices (111A, 111N) at the sites (105A-105C) within the region (103A, 103B). For example, for region B (103B) with multiple sites (105A-105C), the hub network device (113A, 113N) may be located at one of the sites (105A-105C) within region B (103B). The at least one hub network device (113A, 113N) is configured as the point of communication for that region with network devices disposed in other regions of the enterprise network. The hub network devices (113A, 113N) are not limited to the aforementioned specific examples.

In one or more embodiments disclosed herein, the network (117) may be the medium through which the branch network devices (111A, 111N), the hub network devices (113A, 113N), and the network controller (115) are connected within the WAN (100). In one embodiment of the disclosure, the network may include other network devices (or systems) (not shown) that facilitate communication between the aforementioned components. As such, in one embodiment of the disclosure, the network may include any combination of local (e.g., local area network (LAN) and/or WAN segments that may be wire-based and/or wireless and that may use any combination of wired and/or wireless communication protocols.

In one or more embodiments disclosed herein, the network (117) may include one or more service providers (SPs) (119A, 119N) that provide the branch network devices (111A, 111N), the hub network devices (113A, 113N), and the network controller (115) access to the network (117). For example, the service providers (119A, 119N) may be private (e.g., multiprotocol label switching (MPLS) providers) or public (e.g., internet service providers (ISPs)) service providers. The service providers (119A, 119N) are not limited to the aforementioned specific examples and may also include other types of service providers such as, for example, telecommunication service providers.

Figure 2:
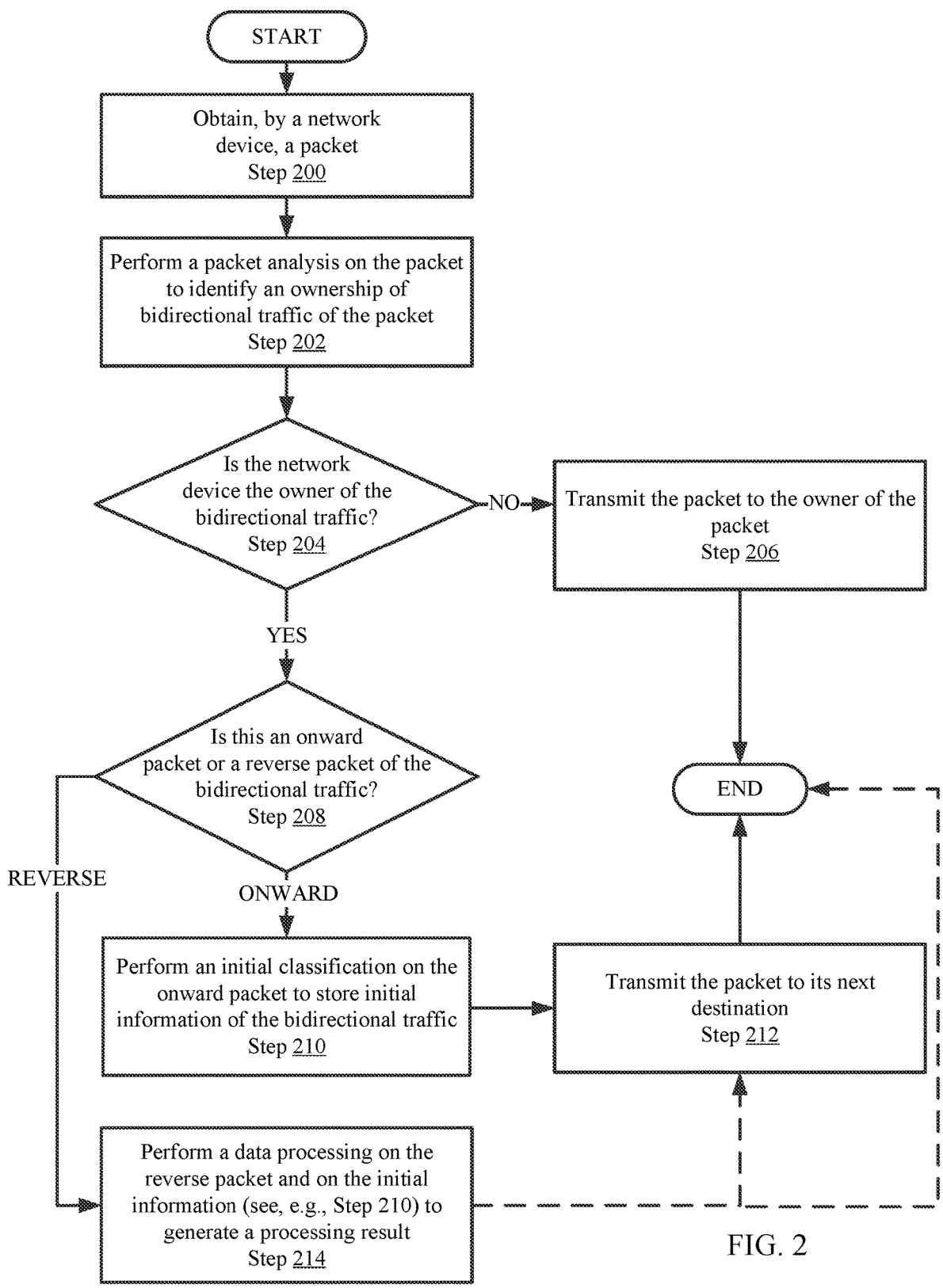
FIG. 2 shows a flowchart in accordance with one or more embodiments described herein.

FIG. 2 shows a flowchart of a method in accordance with one or more embodiments of the disclosure. The method depicted in FIG. 2 may be performed to manage the bidirectional traffic traveling along a network. The method shown in FIG. 2 may be performed by, for example, a network device (e.g., 111A, 111N, 113A, 113N). Other components of the systems in FIGS. 1A-1B may perform all, or a portion, of the method of FIG. 2 without departing from the scope of this disclosure.

While FIG. 2 is illustrated as a series of steps, any of the steps may be omitted, performed in a different order, additional steps may be included, and/or any or all of the steps may be performed in a parallel and/or partially overlapping manner without departing from the disclosure.

In Step 200, a packet is obtained. In one or more embodiments, the packet may be a part of bidirectional traffic obtained from another network device in the network. The other network device may be a branch network device, a hub network device, and/or a client device.

In Step 202, a packet analysis is performed on the packet to identify an ownership of the bidirectional traffic of the packet. The processing in step 202 addresses two scenarios.

In one or more embodiments, the packet analysis includes using a portion of information from the packet to perform a lookup in a lookup table to identify which network device is specified to be associated with the packet. The lookup table may include a set of entries, where each entry includes a hash value and an identifier of the network device (i.e., the network device that is the owner of the flow with which the packet is associated). The hash value may be generated by applying a hash function to a layer 2 (L2) source and/or destination address, a layer 3 (L3) source and/or destination address, an identifier of the subnet associated with the source address, and/or any other information without departing from the technology.

If there is no entry in the lookup table corresponding to the hash value, then the network determines whether or not it should be designated as the owner of the bidirectional traffic with which the packet is associated. This network device may use any known or later discovered mechanism to determine whether the network device should designate itself the owner.

In one or more embodiments, the lookup table is a reverse path lookup (RPL) table. The RPL table may further include one or more entries that each specify a L3 address (e.g., an IP source address) and a validation of the packet based on the source address and/or the destination address. The RPL table may include a list of the source L3 address and an associated owner based on the specified source L3 address.

In another embodiment, the packet analysis includes determining a condition that is met based on the obtained hash value discussed above. For example, the condition may specify that hash values that are even in value are assigned to the network device, and, conversely, the hash values that are odd in value are assigned to a second network device.

In another embodiment, the packet analysis takes into account a current load on the network device and its paired network device. The current load corresponds to resource utilization of the network device. Each network device may include a network device agent configured to monitor the utilization of the resources of the network device in order to determine its current load. For example, the network device agent may measure a combination of the network bandwidth, memory usage, and/or the processing (e.g., CPU) usage of the network device to determine the current load. If no owner is already specified for a given bidirectional traffic, then the network device may determine whether it should be the owner by taking into account its current load and the current load of the paired network device.

In one or more embodiments, the ownership of the packet is identified based on a virtual router redundancy protocol (VRRP). The VRRP may include a virtual router that includes a logical grouping of multiple high availability network devices, where one is assigned as the master network device and therefore the owner of any flows obtained while the network device is assigned master network device. In such embodiments, the determination about whether the network device performing the method of FIG. 2 is the owner of the obtained packet is based on whether such network device is the master network device of the virtual router.

If the network device is not the master network device (e.g., a slave network device or a secondary network device in accordance with the VRRP), then it determines that it is not the owner of the bidirectional traffic and identifies the master network device as the owner.

Continuing with the discussion of FIG. 2, in Step 204, a determination is made about whether the network device is the owner of the bidirectional traffic. Specifically, once the owner for the bidirectional traffic is determined, step 204 determines whether the owner identified in step 204 is the network device (i.e., the network device performing the step 204). If the network device is the owner of the bidirectional traffic, the method proceeds to Step 208; otherwise, the method proceeds to Step 206.

In Step 206, following the determination that the network device is not the owner of the bidirectional traffic of the packet, the packet is transmitted to the owner of the packet, i.e., a second network device. The packet may be transmitted, for example, via forwarding implemented by the network device (e.g., using a forwarding table implemented on the data plane of the network device). Alternatively, the packet is transmitted via an encrypted tunnel (e.g., a virtual local area network (VLAN) tunnel. The transmission may be performed via any other mechanism without departing from the disclosure. The method may end following Step 206.

The second network device may receive the packet transmitted to it via step 206 and then start performing the method in FIG. 2 at step 200. Alternatively, if the packet is set, e.g., via a peer link between the first and second network device, then the second network device may start the processing of the packet at step 208.

Continuing with the discussion of FIG. 2, in Step 208, following the determination that the network device is the owner of the bidirectional traffic, a second determination is made about whether the packet is an onward packet or a reverse packet of the bidirectional traffic. In one or more embodiments, the onward packet relates to a packet initially sent by a client device that specifies a request. In contrast, the reverse packet relates to a packet initially sent by a client device that specifies a response to an onward packet. If the packet is an onward packet, the method proceeds to Step 210; if the packet is a reverse packet, the method proceeds to Step 214.

In Step 210, following the determination that the packet is an onward packet, an initial classification is performed on the onward packet to store initial information of the bidirectional traffic. In one or more embodiments, the initial classification includes extracting at least a portion of the packet (or any metadata thereof) to generate the initial information. The extracted portion may include, for example, a packet size, the source address, the destination address, and/or any other information without departing from the technology.

In one or more embodiments, the initial classification further includes transmitting messages to one or more other network devices in the network that specifies the ownership of the packet. The messages may be provided using a protocol such as, for example, border gateway protocol (BGP). The BGP protocol may be implemented to influence the routing performed by one or more other network devices. The influence may result in the one or more other network devices routing packets associated with the bidirectional traffic to the identified owner of the bidirectional traffic.

In Step 212, the packet is transmitted toward its next destination. The packet may be transmitted using a forwarding table of the data plane of the network device and an address (e.g., a L2 destination address) of the packet to determine the next destination. The packet may be transmitted via an egress interface of the network device operatively connected to the determined destination.

In Step 214, following the determination that the packet is a reverse packet, a data processing is performed on the reverse packet and on any initial information (i.e., the information obtained in Step 210) to generate a processing result. The processing result is then stored in the network device. The processing result may be used by the network device to manage the processing and transmission of packets by the network device.

In one or more embodiments disclosed herein, the data processing includes generating processed information using the initial information and the second packet. The data processing may include, for example, performing a deep packet inspection (DPI). In one or more embodiments, the DPI is a process for inspecting data in the packet to manage the transmission of the packet based on the contents of the packets. The management may include, for example, rerouting the packet, blocking transmission of the packet, and/or authorizing the transmission of the packet. In one or more embodiments, the DPI differs from traditional network traffic filtering in that the DPI includes examining data that is not simply in the header of the packet. For example, DPI includes examining the contents of packets (e.g., including and/or excluding the header) passing through a given network device and making decisions depending on what a packet contains and based on rules assigned by an enterprise, an internet service provider, or a network manager. The decisions may include, for example, performing a classification on the packet, assigning a classification tag, and preventing the packet from being transmitted to its destination.

Once the processing in step 214 is completed, the packet may be transmitted towards its destination (i.e., method proceeds to step 212) or dropped depending on the results of the processing by the network device (i.e., the method ends).

Discussed below are three examples that may each discuss one or more embodiments disclosed herein.

To ensure that a high availability network device that is tasked with processing (or otherwise assigned to process) the bidirectional traffic, embodiments disclosed herein include a method and system for maintaining pre-assigned flow ownership by each of the high availability network devices. For example, a pre-assigned flow ownership is implemented by each high availability network device storing a table that specifies the ownership of each flow based on an attribute (e.g., a source address) of each packet associated with a flow. In another example, a user may specify the ownership of a given flow, e.g., using a configuration file. Another example of the embodiments associated with the pre-assigned flow ownership may be illustrated in FIG. 3A and the corresponding discussion m Example 1.

In one or more embodiments, a method and system includes performing dynamic assignment of ownership of a flow. The dynamic assignment may be performed using conditions implemented by the network devices for determining ownership of the flows. An example of a condition may include performing a hash function on a source address of a packet associated with a flow to obtain a hash value, and assigning the flow to the network device if the hash value is an even number. Alternatively, the dynamic assignment may be performed, for example, based on a load balancing of the high availability network devices. An example of the embodiments associated with dynamic assignment may be illustrated in FIG. 3B and the corresponding discussion in Example 2.

In one or more embodiments, a method and system includes performing assignment of ownership of a flow based on a virtual router redundancy protocol (VRRP). The VRRP may include a virtual router that includes a logical grouping of multiple high availability network devices, where one is assigned as the master network device and therefore the owner of any flows obtained while the network device is assigned master network device. An example of the embodiments associated with a VRRP implementation may be illustrated in FIG. 3C and the corresponding discussion in Example 3.

Example 1—Pre-Assigned Flow Ownership

Consider a scenario in which a high availability domain utilizes high availability network devices that each may be used to transmit data across a wide area network to other domains. FIG. 3A shows a diagram of an example system. A series of steps performed in FIG. 3A are illustrated with numbered circles and described below with brackets (e.g., "[1]"). The example system includes domain A (315A) that includes two high availability network devices (i.e., high availability network device A (309A) and high availability network device B (309B)) and client device 1 (311A). Domain A (315A) may be associated with a local area network (LAN). The example system further includes domain B (315B) that includes hub network device A (307A) that has an operative connection to high availability network device A (309A) via a wide area network (302). Domain B (315B) further includes hub device B (307B) that has an operative connection to high availability network device B (309B) via the wide area network (302). Finally, Domain B (315B) includes client device 2 (311B). Domain B (315B) is associated with a headquarters in which client 2 (311B) includes application information that may be used by client 1 (311A).

Figure 3A:
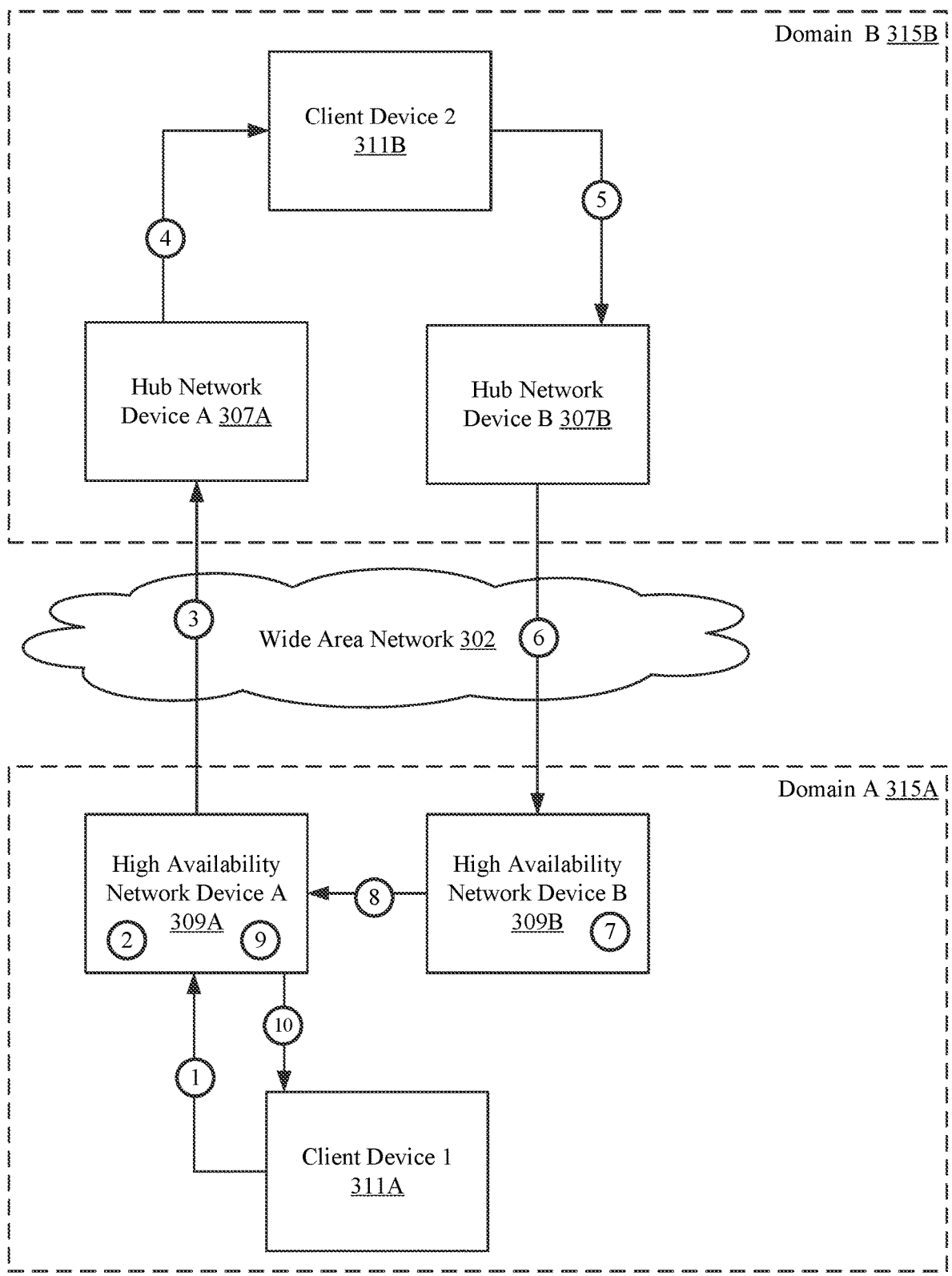
FIGS. 3A-3C show an example in accordance with one or more embodiments described herein.

While not illustrated in FIG. 3A, each of the components in a domain (e.g., 315A, 315B) may be operably connected via any combination of subnets and/or any other intermediate network devices (e.g., local area network (LAN) routers). For example, client device 1 (311A) may operatively connect to high availability network device A (309A) via a subnetwork (not shown) that operatively connects to a router that operatively connects to both high availability network devices (309A, 309B) in domain A (315A).

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Further, the high availability network devices (309A, 309B) may be operatively connected via a previously established path selection. For example, based on previously processed flow information and/or network device information and policies, high availability network devices A (309A) and B (309B) established a path via the dynamic path selection (DPS) mechanism. The path may be implemented via, for example, a virtual tunnel. Further, a path between high availability network device A (309A) and hub device A (307A) may be established using the DPS mechanism. Additionally, high availability network device B (309B) and hub device B (307B) may be established using the aforementioned DPS mechanism. Each of the aforementioned paths may be implemented via, for example, a virtual tunnel. While embodiments disclosed herein discuss a DPS mechanism, other path selection mechanisms for establishing operative connections between network devices may be implemented without departing from the disclosure.

As disclosed herein, a DPS mechanism relates to a mechanism for dynamic load balancing for network devices. The DPS mechanism is implemented by assessing real-time network conditions of coexisting multipaths (e.g., in wide array networks (WANs)) and based on the assessment, ensure traffic flows to a suitable egress path in a multipath network configuration. The system of network devices receives (e.g., periodically or continually) real-time network telemetric data representing real-time traffic telemetric characteristics of each network path of coexisting multipaths. Flows are distributed across the network paths based on the network telemetric data to avoid network congestion and optimize network performance. For example, latency and jitter-related performance degradation may be avoided or, at least, lessened. Similarly, bandwidth bottlenecks are avoided or, at least, lessened.

The system attempts to utilize most or nearly all, if not all, available network path bandwidth at any given time. Preferably, load balancing is performed dynamically based on real-time or near real-time network telemetry measurements by tracking changing network telemetric characteristics. Accordingly, a hashed flow need not maintain fixed routing and can instead benefit from hashed flows reflecting changing network conditions. The disclosed load balancing is therefore adaptive. Various adaptive load balancing processes exhibit reliable and efficient network characteristics and avoid path saturation or bottlenecks due to path bandwidth constraints, for example.

Continuing with the example, client device 1 (311A) communicates with client device 2 (311B) using the high availability network devices (309A, 309B) and the hub network devices (307A, 307B) and any intermediate network devices (not shown) in the wide area network (302). The communication may include sending packets by client device 1 (311A) to client device 2 (311B). Client device 1 (311A) sends a packet to high availability device A (309A) [1]. High availability network device A (309A) analyzes the packet to identify the source IP address, the destination IP address, and a subnetwork identifier for the subnetwork used for transmitting the packet to the high availability network device (309A).

At [2], the high availability network device A (309A) utilizes a lookup table (e.g., a reverse path lookup (RPL) table) to determine an owner of the packet. The RPL table may include entries that specify identifiers of source IP addresses and a mapping to which high availability network device (309A, 309B) owns any bidirectional traffic associated with such source IP address. Further, using a protocol such as border gateway protocol (BGP), high availability network device (309A) transmits a message to high availability network device B (309B) and/or the hub network devices (307A, 307B) that specifies the ownership of the bidirectional traffic associated with the packet in addition to routing information corresponding to traffic associated with the packet.

Continuing with the example, high availability network device A (309A) determines, using the RPL table, that it is the owner of the aforementioned flow. Based on this determination, the high availability network device A (309A) classifies the packet, e.g., using deep packet inspection (DPI). After the classification, the high availability network device A (309A) stores information corresponding to the classification in the high availability network device A (309A) and transmits, based on the DPS mechanism (which may use part or all of the classification), the packet to hub device A (307A) via the wide area network (302) [3]. Hub network device A (307A) transmits, based on the DPS mechanism, the packet to client 2 (311B) [4].

Client device 2 (311B) processes the packet and transmits a reverse packet in response to the packet received from client device 1 (311A). The reverse packet is transmitted to hub device B (307B) based on the routing and/or forwarding performed by client device 2 (311B) [5]. Using the DPS mechanism discussed above, hub network device B transmits the reverse packet to high availability network device B (309B) [6].

High availability network device B (309B) analyzes the packet using a second lookup table (e.g., a RPL table of high availability network device B (309B)) that specifies each source IP address and the corresponding owner of traffic obtained from the source IP address. The high availability network device B (309B) uses the second RPL table to determine that the packet is owned by high availability network device A (309A), and as such, the packet is to be processed by high availability network device A (309A) [7]. High availability network device B (309B) transmits the reverse packet to high availability network device A (309A) [8]. High availability network device A (309A), in response to obtaining the reverse packet, performs the DPI on the reverse packet. The DPI includes performing a classification of the packet. After the classification, the high availability network device A (309A) stores information corresponding to the DPI in the high availability network device A (309A) [9]. The reverse packet is then sent to client 1 (311A) [10].

While the above example discusses the use of DPI for processing packets, other processing mechanisms may be performed on the packets without departing from the technology.

End of Example 1

Example 2—Dynamic Assignment of Flow Ownership

Consider a second scenario in which a high availability domain utilizes high availability network devices that each may be used to transmit data across a wide area network to other domains. To clarify aspects of example 2, the description of the example described below is similar to the description of example 1. Notable differences include, but are not limited to: the high availability network device A (309A) performs a hash function on data specified in the header of the packets to determine ownership (in contrast to utilizing a RPL), high availability network device A (309A) returns the response packet indirectly using high availability network device B (309B), and the discussion of dynamic assignment of flow ownership (in contrast to static assignment as discussed in example 1). A series of steps performed in FIG. 3B are illustrated with numbered circles and described below with brackets (e.g., "[1]").

Figure 3B:
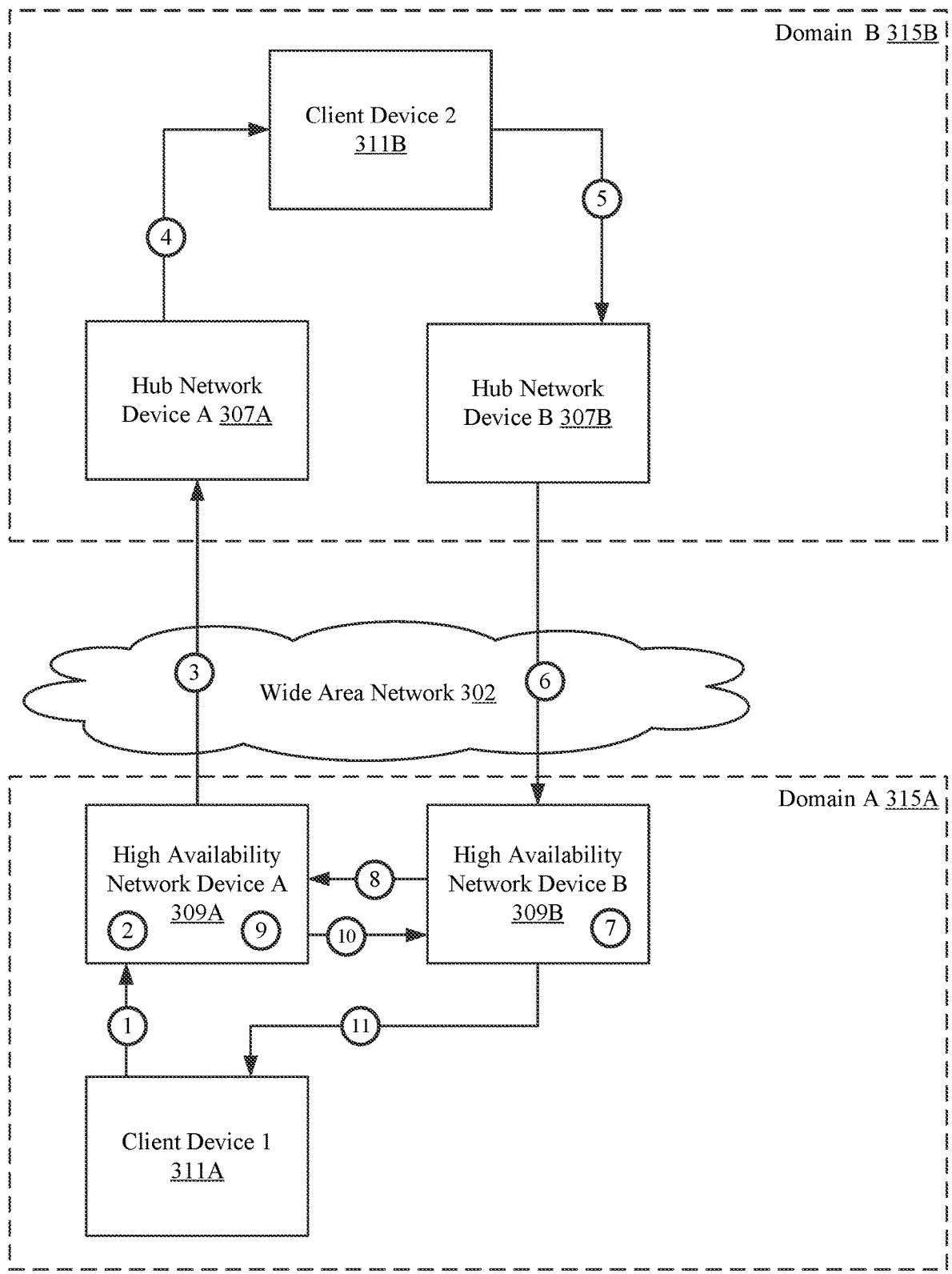

FIG. 3B shows a diagram of an example system. The example system includes domain A (315A) that includes two high availability network devices (high availability network device A (309A) and high availability network device B (309B)) and client device 1 (311A). Domain A (315A) may be associated with a local area network (LAN). Client device 1 (311A) may utilize the high availability network devices (309A, 309B) to communicate with domain B (351B). As such, the networking load applied to the high availability network devices (309A, 309B) may benefit from a load balancing to improve the distribution of the networking load. Each of the high availability network devices (309A, 309B) may perform load balancing mechanisms to determine whether to perform data processing on obtained packets.

The example system further includes domain B (315B) that includes hub network device A (307A) that has an operative connection to high availability network device A (309A) via a first service provider (not shown) executing on a wide area network (302). Domain B (315B) further includes hub device B (307B) that has an operative connection to high availability network device B (309B) via a second service provider (not shown) executing on the wide area network (302). Finally, domain B (315B) includes client device 2 (311B). Domain B (315B) is associated with a headquarters in which client 2 (311B) includes application information that may be used by client 1 (311A).

While not illustrated in FIG. 3B, each of the components in a domain (e.g., 315A, 315B) may be operatively connected via any combination of subnets and/or any other intermediate network devices (e.g., local area network (LAN) routers). For example, client device 1 (311A) may operatively connect to high availability network device A (309A) via a subnetwork (not shown) that operatively connects to a router that operatively connects to both high availability network devices (309A, 309B) in domain A (315A).

Further, the high availability network devices (309A, 309B) may be operatively connected via a previously established path selection (e.g., determined using the DPS mechanism). For example, based on previously processed flow information and/or network device information and policies, high availability network devices A (309A) and B (309B) established a path via DPS. The path may be implemented via, for example, a virtual tunnel. Further, a path between high availability network device A (309A) and hub device A (307A) may be established using the aforementioned path selection mechanism. Additionally, high availability network device B (309B) and hub device B (307B) may be established using the aforementioned path selection mechanism. Each of the aforementioned paths may be implemented via, for example, a virtual tunnel. While embodiments disclosed herein discuss a DPS mechanism, other mechanisms for establishing operative connections between network devices may be implemented without departing from the disclosure.

Continuing with the example, client device 1 (311A) communicates with client device 2 (311B) using the high availability network devices (309A, 309B) and the hub network devices (307A, 307B) and any intermediate network devices (not shown) in the wide area network (302). The communication may include sending packets by client device 1 (311A) to client device 2 (311B). Client device 1 (311A) sends a packet to high availability device A (309A) [1]. High availability network device A (309A) analyzes the packet to identify the source IP address, the destination IP address, and a subnet identifier of the subnet from which the packet is obtained. High availability network device A (309A) applies a function (e.g., a hash function) to the identified addresses, identifiers of the source and destination ports, and the protocol type specified in its header to generate a hash value. High availability network device A (309A) consults, using the hash value, a lookup table to determine whether the high availability network device (309A) is the owner of the flow with which the packet is associated.

The lookup table may specify static assignments of flow ownership for the high availability network devices (309A, 309B). The lookup table may be a table of hash values each corresponding to possible flows and an assignment to one of the high availability network devices (309A, 309B). In such cases in which an incoming flow is not specified in the lookup table, a set of criteria may be implemented to determine which of the high availability network devices (309A, 309B) is to become the owner. For example, a criterion may be based on whether the generated hash value is even or odd. In this example, high availability network device A (309A) may be assigned flows for which the hash values are even, and high availability network device B (309B) is assigned flows for which the hash values are odd. Other criteria may be used to determine the assignment of flow ownership without departing from this disclosure. Based on the determination, the high availability network device A (309A) transmits, using the DPS mechanism discussed above (which may use part or all of the classification), the packet to hub device A (307A) via the wide area network (302) [3]. Hub network device A (307A) transmits the packet to client 2 (311B) [4].

Though this example utilizes an operative connection between high availability network device A (309A) and hub network device A (307A) to transmit the packet to domain B (315B), other operative connections may be used. For example, the packet may be transmitted to high availability network device B (309B) to be transmitted to hub network device B (307B) via the WAN (302). This example may be performed based on a lost connection between high availability network device A (309A) and the WAN (302).

Continuing with Example 2, client device 2 (311B) processes the packet and transmits a reverse packet in response to the packet. The reverse packet is transmitted to hub device B (370B) [5]. Using the DPS mechanism discussed above, hub network device B transmits the reverse packet to high availability network device B (309B) [6].

High availability B (309B) analyzes the packet by performing a second hash on the source IP address, the destination IP address, identifiers of the source and destination ports, and the protocol type specified in its header. The second hash value is searched in a lookup table to determine that the packet is to be processed by high availability network device A (309A) [7]. High availability network device B (309B) transmits the reverse packet to high availability network device A (309A) [8]. High availability network device A (309A), in response to obtaining the reverse packet, performs a deep packet inspection (DPI) on the reverse packet. After the classification, the high availability network device A (309A) stores information corresponding to the DPI in the high availability network device A (309A) [9]. The reverse packet is then sent to high availability network device B (309B) [10]. High availability network device B (309B) transmits the reverse packet to client device 1 (311A) [11].

While the above example discusses the use of DPI for processing packets, other processing mechanisms may be performed on the packets without departing from the technology.

End of Example 2

Example 3—VRRP-Based Flow Ownership

Consider a second scenario in which a high availability domain utilizes high availability network devices that each may be used to transmit data across a wide area network to other domains. FIG. 3C shows a diagram of an example system. The example system includes domain A (315A) that includes two high availability network devices (high availability network device A (309A) and high availability network device B (309B)) and one client device (client device 1 (311A)). Domain A (315A) may be associated with a local area network (LAN) that operates using a virtual router redundancy protocol (VRRP). Client device 1 (311A,) may utilize the high availability network devices (309A, 308B) to communicate with domain B (315B). The high availability network devices (309A, 309B) may be logically grouped as a VRRP virtual router (320), and high availability network device A (309A) is designated as the master network device and high availability network device B (309B) as the secondary network device.

The example system further includes domain B (315B) that includes hub network device A (307A) that has an operative connection to high availability network device A (309A) via a first service provider (not shown) executing on a wide area network (302). Domain B (315B) further includes hub device B (307B) that has an operative connection to high availability network device B (309B) via a second service provider (not shown) executing on the wide area network (302). Finally, domain B (315B) includes client device 2 (311B). Domain B (315B) is associated with a headquarters in which client 2 (311B) includes application information that may be used by client 1 (311A).

Figure 3C:
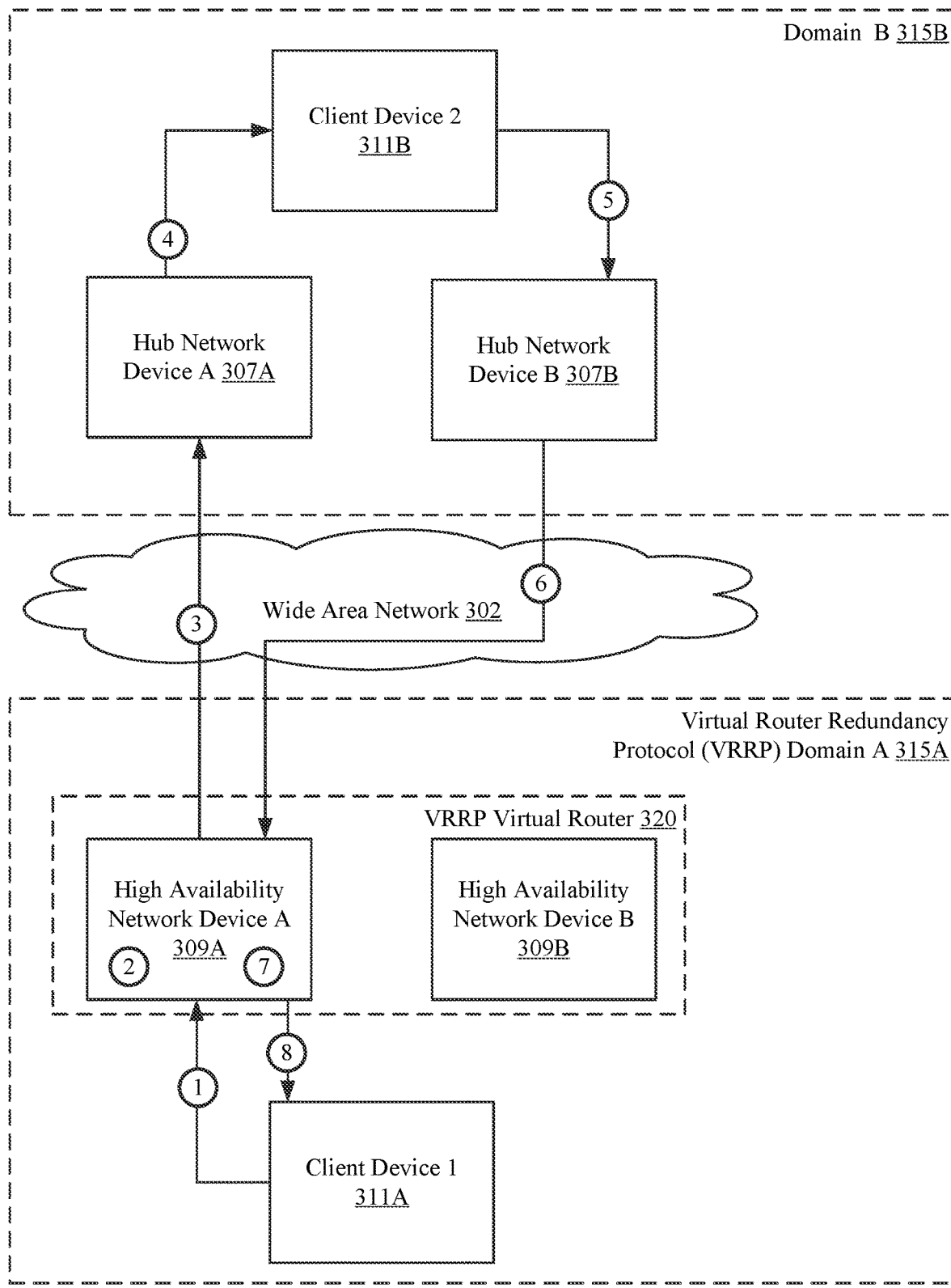

While not illustrated in FIG. 3C, each of the components in a domain (e.g., 315A, 315B) may be operatively connected via any combination of subnets and/or any other intermediate network devices (e.g., local area network (LAN) routers). For example, client device 1 (311A) may operatively connect to high availability network device A (309A) via a subnetwork (not shown) that operatively connects to a router that operatively connects to both high availability network devices (309A, 309B) in domain A (315A).

Client device 1 (311A) communicates with client device 2 (311B) using the high availability network devices (309A, 309B) and the hub network devices (307A, 307B) and any intermediate network devices (not shown) in the wide area network (302). The communication may include sending packets by client device 1 (311A) to client device 2 (311B). Client device 1 (311A) sends a packet to high availability device A (309A) [1]. High availability network device A (309A) analyzes the packet to identify the source IP address and the destination IP address. Because of the designation as the master network device for the VRRP virtual router, high availability network device A (309A) determines that the bidirectional traffic associated with the packet is to be classified by high availability network device A (309A) [2]. Further, using a protocol such as BGP, high availability network device (309A) transmits a message to high availability network device B (309B) and the hub network devices (307A, 307B) that specifies the ownership of the bidirectional traffic associated with the packet in addition to routing information corresponding to traffic associated with the packet. In this manner, any packets with an IP address corresponding to client 1 are transmitted via network device (309A). Based on the determination, the high availability network device A (309A) transmits the packet to hub device A (307A) via the wide area network (302) [3]. Hub network device A (307A) transmits the packet to client 2 (311B) [4]. Further, high availability network device B (309B) transmits a message to high availability network device A (309A) and the hub network devices (307A, 307B) that specifies the ownership of high availability network device A (309A) and an indication that high availability network device B (309B) can take ownership of the bidirectional traffic in the event that high availability network device A (309A) becomes unavailable.

Client device 2 (311B) processes the packet and transmits a reverse packet in response to the packet. The reverse packet is transmitted to hub device B (370B) [5]. Hub network device B transmits the reverse packet to high availability network device A (309A) because of the previously obtained notification from high availability network device A (309A) that high availability network device A (309A) is the owner of the bidirectional traffic associated with the reverse packet. [6].

High availability network device A (309A), in response to obtaining the reverse packet, performs a deep packet inspection (DPI) on the reverse packet. After the classification, the high availability network device A (309A) stores information corresponding to the DPI in the high availability network device A (309A) [7]. High availability network device B (309B) transmits the reverse packet to client device 1 (311A) [8].

While the above example discusses the use of DPI for processing packets, other processing mechanisms may be performed on the packets without departing from the technology.

End of Example 3

Figure 4:
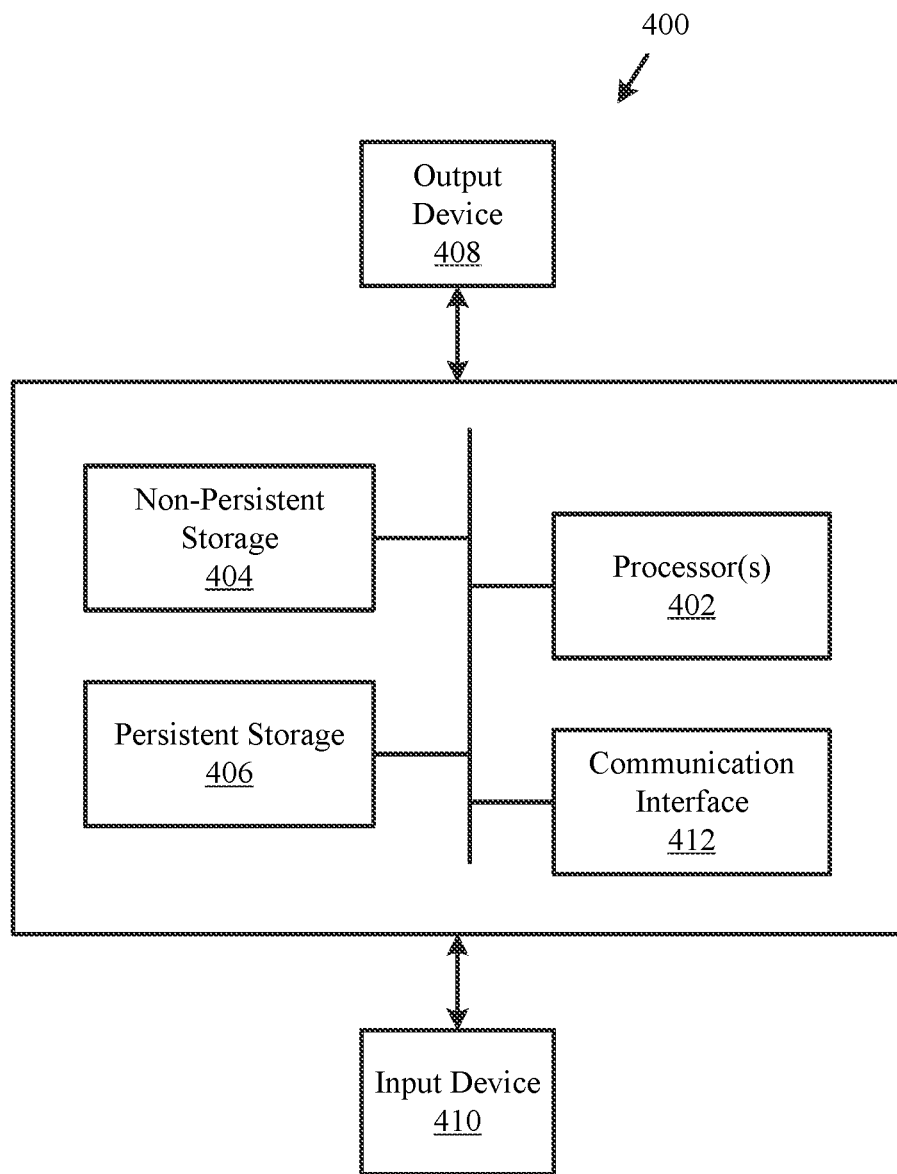
FIG. 4 shows a diagram of a computing device in accordance with one or more embodiments described herein.

As discussed above, embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, the computer processor(s) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a network, the method comprising:
    obtaining, by a network device, a packet as part of bidirectional traffic between a first client device and a second client device;
    determining, by the network device and using the packet, whether or not the network device is an owner of the bidirectional traffic;
    based on determining that the network device is not the owner of the bidirectional traffic, transmitting, by the network device, the packet to an additional network device for additional packet processing, the additional network device being the owner of the bidirectional traffic;
    based on determining that the network device is the owner of the bidirectional traffic, determining, by the network device, whether the packet is an onward packet of the bidirectional traffic or a reverse packet of the bidirectional traffic;
    based on determining that the packet is the onward packet of the bidirectional traffic, performing, by the network device, an initial classification on the onward packet to store initial information of the bidirectional traffic and transmit the onward packet towards the second client device; and
    based on determining that the packet is the reverse packet of the bidirectional traffic, performing, by the network device, data processing on the reverse packet and on initial information of the bidirectional traffic previously stored based on a previous onward packet of the bidirectional traffic to generate a processing result.

2. The method of claim 1, wherein the network device and the additional network device are high availability network devices.

3. The method of claim 1, wherein the data processing comprises a deep packet inspection (DPI).

4. The method of claim 1,
    wherein determining whether or not the network device is the owner of the bidirectional traffic is based on a reverse path lookup (RPL) table of the network device, and
    wherein the RPL table comprises a plurality of entries each specifying an address.

5. The method of claim 4, wherein an entry in the plurality of entries specifies a source address of the packet, a destination address of the packet, and an identifier of the network device.

6. The method of claim 1, wherein determining whether or not the network device is the owner of the bidirectional traffic is based on a virtual router redundancy protocol (VRRP).

7. The method of claim 1,
    wherein determining whether or not the network device is the owner of the bidirectional traffic is based on a lookup table of the network device,
    wherein the lookup table comprises a set of hash values and an assignment of ownership corresponding to each hash value, and
    wherein a hash value of the set of hash values is generated based on a source address of the packet and a destination address of the packet.

8. The method of claim 1, wherein the reverse packet is received by the network device via a service provider of a wide area network (WAN).

9. The method of claim 1, further comprising:
    based on determining that the packet is the reverse packet of the bidirectional traffic, transmitting, by the network device, the reverse packet towards the first client device via the additional network device.

10. A system, comprising:
    a network device operable with an additional network device,
    wherein the network device is programmed to:
        obtain a packet as part of bidirectional traffic between a first client device and a second client device;

perform a packet analysis on the packet to identify ownership of the bidirectional traffic by determining whether or not the network device is an owner of the bidirectional traffic;

based on determining that the network device is not the owner of the bidirectional traffic, transmit the packet to the additional network device for additional packet processing, the additional network device being the owner of the bidirectional traffic;

based on determining that the network device is the owner of the bidirectional traffic, determine whether the packet is an onward packet of the bidirectional traffic or a reverse packet of the bidirectional traffic;

based on determining that the packet is the onward packet of the bidirectional traffic, perform an initial classification on the onward packet to store initial information of the bidirectional traffic and transmit the onward packet towards the second client device; and based on determining that the packet is the reverse packet of the bidirectional traffic, perform data processing on the reverse packet and on initial information of the bidirectional traffic previously stored based on a previous onward packet of the bidirectional traffic to generate a processing result.

11. The system of claim 10, wherein the network device is programmed to, based on determining that the packet is the reverse packet of the bidirectional traffic, transmit the reverse packet towards the first client device.

12. The system of claim 10, wherein the network device and the additional network device are high availability network devices.

13. The system of claim 10, wherein the data processing comprises a deep packet inspection (DPI).

14. The system of claim 10, wherein determining whether or not the network device is the owner of the bidirectional traffic is based on a load balancing performed on the network device and the additional network device.

15. The system of claim 10, wherein determining whether or not the network device is the owner of the bidirectional traffic is based on a lookup table of the network device.

16. The system of claim 10, wherein the reverse packet is received by the network device via a service provider of a wide area network (WAN).

17. The system of claim 10, wherein the network device is programmed to, based on determining that the packet is the reverse packet of the bidirectional traffic, transmit the reverse packet towards the first client device via the additional network device.

18. A method for managing a network, the method comprising:

obtaining, by a first network device, an onward packet of bidirectional traffic, wherein the first network device is coupled to a second network device, wherein the second network device is not an owner of the bidirectional traffic and wherein the onward packet is from a first client device and is destined for a second client device;

determining, by the first network device, that the first network device is the owner of the bidirectional traffic;

performing, by the first network device and in response to determining that the first network device is the owner, an initial classification on the onward packet to store initial information of the bidirectional traffic;

after performing the initial classification, transmitting the onward packet towards the second client device;

after transmitting the onward packet, receiving, by the first network device and from the second network device, a reverse packet of the bidirectional traffic, wherein the reverse packet is from the second client device and is destined for the first client device;

performing, by the first network device, data processing on the reverse packet using the initial information to generate a processing result; and after performing the data processing, transmitting, by the first network device, the reverse packet towards the first client device by transmitting the reverse packet to the second network device.

19. The method of claim 18, wherein the data processing comprises a deep packet inspection (DPI).

20. The method of claim 18, wherein the onward packet is transmitted towards the second client device via a service provider of a wide area network (WAN).

* * * * *